US012191463B2

(12) United States Patent  
Diegoli (10) Patent No.: US 12,191,463 B2  
(45) Date of Patent: Jan. 7, 2025

(54) SPENT OR DECOMMISSIONED ACCUMULATOR TREATMENT PLANT AND PROCESS

(71) Applicant: ENGITEC TECHNOLOGIES S.P.A., Novate Milanese (IT)

(72) Inventor: Gianfranco Diegoli, Cesano Maderno (IT)

(73) Assignee: ENGITEC TECHNOLOGIES S.P.A., Novate Milanese (IT)

( * ) Notice: Subject to any disclaimer, the term of this patent is extended or adjusted under 35 U.S.C. 154(b) by 326 days.

(21) Appl. No.: 17/777,554

(22) PCT Filed: Nov. 17, 2020

(86) PCT No.: PCT/IB2020/060806  
§ 371 (c)(1),  
(2) Date: May 17, 2022

(87) PCT Pub. No.: WO2021/099930  
PCT Pub. Date: May 27, 2021

(65) Prior Publication Data  
US 2022/0416323 A1 Dec. 29, 2022

(30) Foreign Application Priority Data  
Nov. 20, 2019 (IT) .................... 102019000021687

(51) Int. Cl.  
*H01M 10/54* (2006.01)  
*B03B 9/06* (2006.01)  
(Continued)

(52) U.S. Cl.  
CPC ............ *H01M 10/54* (2013.01); *B03B 9/061* (2013.01); *B07C 5/3416* (2013.01); *G01N 23/04* (2013.01);  
(Continued)

(58) Field of Classification Search  
CPC ......... H01M 10/54; H01M 6/52; B03B 9/061; B03B 2009/066; B07C 5/3416;  
(Continued)

(56) References Cited

U.S. PATENT DOCUMENTS

2018/0179650 A1* 6/2018 Poll ........................... C25C 7/00  
2022/0081315 A1* 3/2022 Fox ....................... H01M 10/54

FOREIGN PATENT DOCUMENTS

CN 109590307 A 4/2019  
DE 44 07 768 A1 9/1995  
(Continued)

OTHER PUBLICATIONS

International Search Report & Written Opinion issued Feb. 16, 2021 in PCT/IB2020/060806 filed on Nov. 17, 2020, 14 pages.  
(Continued)

*Primary Examiner* — Jacob S. Scott  
*Assistant Examiner* — Miraj T. Patel  
(74) *Attorney, Agent, or Firm* — Oblon, McClelland, Maier & Neustadt, L.L.P.

(57) ABSTRACT

A spent and/or decommissioned accumulator treatment plant and process, wherein a plurality of objects originating from separate waste collection of spent and/or decommissioned accumulators, nominally comprising lead-acid accumulators and accumulators and objects of a different type, are subject to an X-ray scan. If an analysis of the X-ray scan indicates that an object is not a lead-acid accumulator, and in particular is a lithium-ion battery or accumulator, it is deviated out of the treatment workflow, that comprises grinding the objects and separating lead from other materials.

18 Claims, 7 Drawing Sheets

(51) Int. Cl.
    *B07C 5/34*     (2006.01)
    *G01N 23/04*     (2018.01)
    *G01N 23/083*     (2018.01)
    *G06T 7/00*     (2017.01)

(52) U.S. Cl.
    CPC ............ *G01N 23/083* (2013.01); *G06T 7/001* (2013.01); *B03B 2009/066* (2013.01); *B07C 2501/0054* (2013.01); *G01N 2223/04* (2013.01); *G01N 2223/3308* (2013.01); *G01N 2223/401* (2013.01); *G01N 2223/50* (2013.01); *G01N 2223/643* (2013.01); *G06T 2207/10116* (2013.01); *G06T 2207/20081* (2013.01); *G06T 2207/20084* (2013.01); *G06T 2207/30108* (2013.01)

(58) Field of Classification Search
    CPC ............ B07C 2501/0054; G01N 23/04; G01N 23/083; G01N 2223/04; G01N 2223/3308; G01N 2223/401; G01N 2223/50; G01N 2223/643; G06T 7/001; G06T 2207/10116; G06T 2207/20081; G06T 2207/20084; G06T 2207/30108; Y02W 30/84

See application file for complete search history.

(56) References Cited

FOREIGN PATENT DOCUMENTS

| | | |
|---|---|---|
| EP | 0 795 919 A2 | 9/1997 |
| EP | 1 132 992 A1 | 9/2001 |
| WO | WO 2010/097621 A2 | 9/2010 |

OTHER PUBLICATIONS

International Preliminary Report on Patentability issued Oct. 29, 2021 in PCT/IB2020/060806 filed on Nov. 17, 2020, 15 pages.

\* cited by examiner

SPENT OR DECOMMISSIONED ACCUMULATOR TREATMENT PLANT AND PROCESS

CROSS-REFERENCE TO RELATED APPLICATIONS

The present application is a 35 U.S.C. § 371 national stage application of International patent application PCT/IB2020/060806, filed Nov. 17, 2020, which is based on and claims the benefit of priority to Italian Application No. 102019000021687, filed Nov. 20, 2019. The entire contents of these applications are incorporated herein by reference.

The present invention relates to a spent or decommissioned accumulator treatment plant and process, in particular for recovery of lead contained in lead-acid accumulators.

Lead-acid accumulators have been known for nearly two centuries, but are still widely used also in view of their low cost, in particular in the automotive industry to allow the starting of the heat engine and power all on-board electric utilities. For several other uses, in particular for powering portable electronic components such as mobile phones, computers, music players, etc., conversely, power supplies and batteries based on different materials and electrochemical reactions, in particular lithium-ion (Li-Ion) batteries and accumulators, are nowadays more widespread.

At the end of their useful lifetime, lead-acid accumulators are subject to recycling processes to recover the materials that form the different components thereof. A conventional lead-acid accumulator recycling process provides for the grinding of the spent accumulators and the subsequent separation of the ground part into homogeneous material fractions. Spent or decommissioned lead-acid accumulators are generically collected together with batteries and accumulators of different types, from which they are not always immediately visually distinguishable. In particular, the appearance of lead-acid accumulators for automotive use is often completely confusingly similar to that of lithium-ion accumulators, also due to the fact that they must fit into standard-sized compartments. Although the weight of lead-acid accumulators is much higher than that of lithium-ion accumulators of a same size, an initial sorting carried out by an operator person is not error-proof.

The solvent used in lithium-ion accumulators can be flammable in some cases; moreover, this type of accumulators retains a fair amount of electric charge even after decommissioning, and a short circuit between the poles can cause an explosion. When a lithium-ion accumulator enters a spent or decommissioned lead-acid accumulator treatment plant, there is therefore a high risk of explosion, especially during the initial grinding phase when its electrodes are more likely to be short-circuited; and indeed the mill is provided with suitable shielding to contain the small explosions that occur inside it. In addition to the risks of damage to the facilities due to the explosion, there are the associated risks of injury to the operators, and also chemical risks due to the inhalation of harmful substances developed, primarily from lithium and lead (but also from other substances making up the treated accumulators), during the explosion or as a result of the increased temperatures.

The technical problem at the basis of the invention is, therefore, to overcome the above-mentioned drawbacks, in particular by providing a spent or decommissioned accumulator treatment plant and process having increased safety, and that in particular reduces the likelihood that a non-lead-acid accumulator will reach the mill intended for grinding the spent or decommissioned accumulators, thus reducing the risk of explosion.

In a first aspect thereof, the invention relates to a spent and/or decommissioned accumulator treatment plant, comprising a grinding mill, at least one separator stage of lead from other materials downstream of the mill, and a sorting device upstream of the mill, configured to receive a plurality of objects originating from separate waste collection of spent and/or decommissioned accumulators and to deviate, from a treatment workflow, objects other than lead-acid accumulators so that they do not enter the mill. The sorting device comprises an X-ray detector configured to perform an X-ray scan of the plurality of objects and a processor configured to analyze, for each object, whether the X-ray scan indicates that it is not a lead-acid accumulator.

In a second aspect thereof, the invention relates to a process for treating spent and/or decommissioned accumulators, comprising the steps of:
a) feeding a plurality of objects originating from separate waste collection of spent and/or decommissioned accumulators to a treatment plant, said objects nominally comprising lead-acid accumulators and accumulators and objects of a different type,
b) grinding objects of said plurality of objects,
c) separating lead from other materials subsequently to step b), characterized in that previously to said step b), the steps of:
i) subjecting said plurality of objects to an X-ray scan, and
ii) analyzing, for each object, whether the X-ray scan indicates that it is not a lead-acid accumulator and, in the affirmative case, deviating said object out of the treatment operating sequence; in the negative case, forwarding said device to step b) are carried out.

The Applicant has surprisingly recognized that, despite the known radiation absorption properties of lead, in view of which lead is conventionally used as a shielding element in radiography, X-ray analysis of high lead content objects still allows to identify those objects, and to discern them from objects containing metals, and possibly other materials, other than lead. Thus, only lead-acid accumulators are forwarded to the mill, for grinding thereof, while lithium-ion batteries and accumulators, or of other types containing explosive or harmful elements, or in any case such as to represent impurities compared to the lead that is recovered by the plant, are not forwarded.

Preferred features of the plant and process of the invention are set forth in the dependent claims.

Further features and advantages of the present invention will be more clearly apparent from the following detailed description of some preferred embodiments thereof, made with reference to the attached drawings, wherein.

Figure 1:
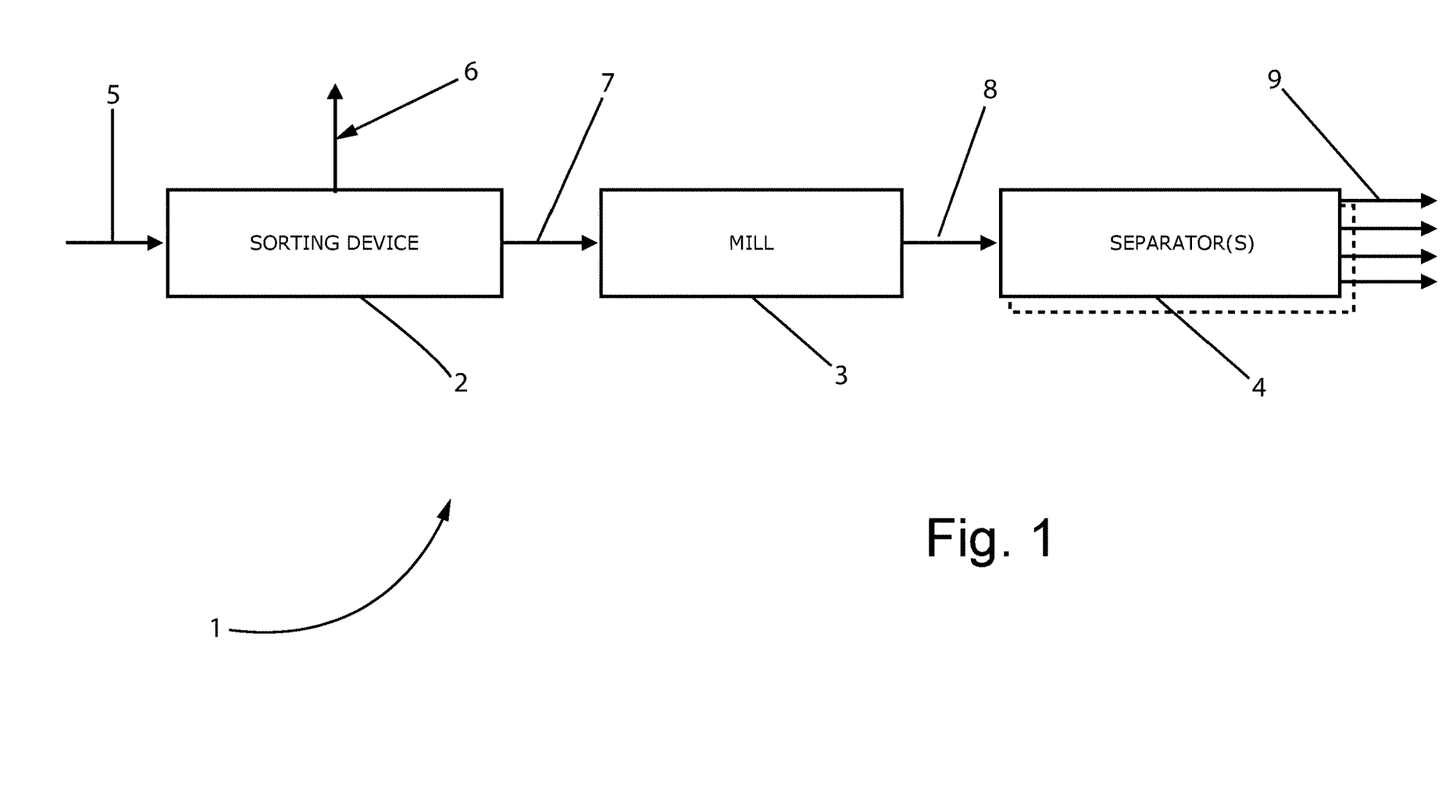
FIG. 1 is a block diagram relating to a spent and/or decommissioned accumulator treatment plant according to the invention.

In FIG. 1 a block diagram of a spent and/or decommissioned lead-acid accumulator treatment plant 1 according to the invention is shown. Plant 1 comprises a sorting device 2, a mill 3 and at least one separator stage 4.

Input material 5 originating from separate waste collection of spent and/or decommissioned accumulators is input, for example in batches, to sorting device 2. This material, that nominally should only contain lead-acid accumulators, but that may comprise accumulators other than lead-acid accumulators, other undesired devices or various objects, may have optionally been subject to a preliminary step of sorting performed by an operator person.

In sorting device 2, such accumulators other than lead-acid accumulators, such other devices or such various objects, which avoided the preliminary sorting if provided for, are largely deviated from the main workflow as reject 6 in a manner better described below, so that they do not enter mill 3. The reject material 6 may be subject to a downstream check by an operator, during which any lead-acid accumulators mistakenly rejected by the sorting device 2 may be recovered and re-inserted into the input material 5 (according to a path not shown in FIG. 1).

The fraction of input material 5 that is not deviated as reject 6 is input to mill 3 as material to be ground 7.

The ground material 8 output by mill 3 is forwarded to the above mentioned one or more separator stage(s) 4, typically of the hydrostatic and/or hydrodynamic type, which divide it into preferably homogeneous material fractions, referred to as a whole with reference number 9, one of which fractions is comprised of the so-called lead paste, namely the accumulator active mass on which, during use, the charging and discharging processes take place. The other fractions comprise, typically, a polymeric material fraction deriving from the outer casings of the accumulators; a polymeric material fraction deriving from the separators of the accumulators; a metallic fraction comprised of the material that forms the grids (electrodes) and the poles of the accumulators. Those skilled in the art shall understand that plant 1 has been greatly simplified compared to a real plant, and that there may be several components and material flows additional to those shown, including diluent liquid flows, recirculation flows, mechanical treatment devices and chemical treatment devices of the various fractions.

Figure 2:
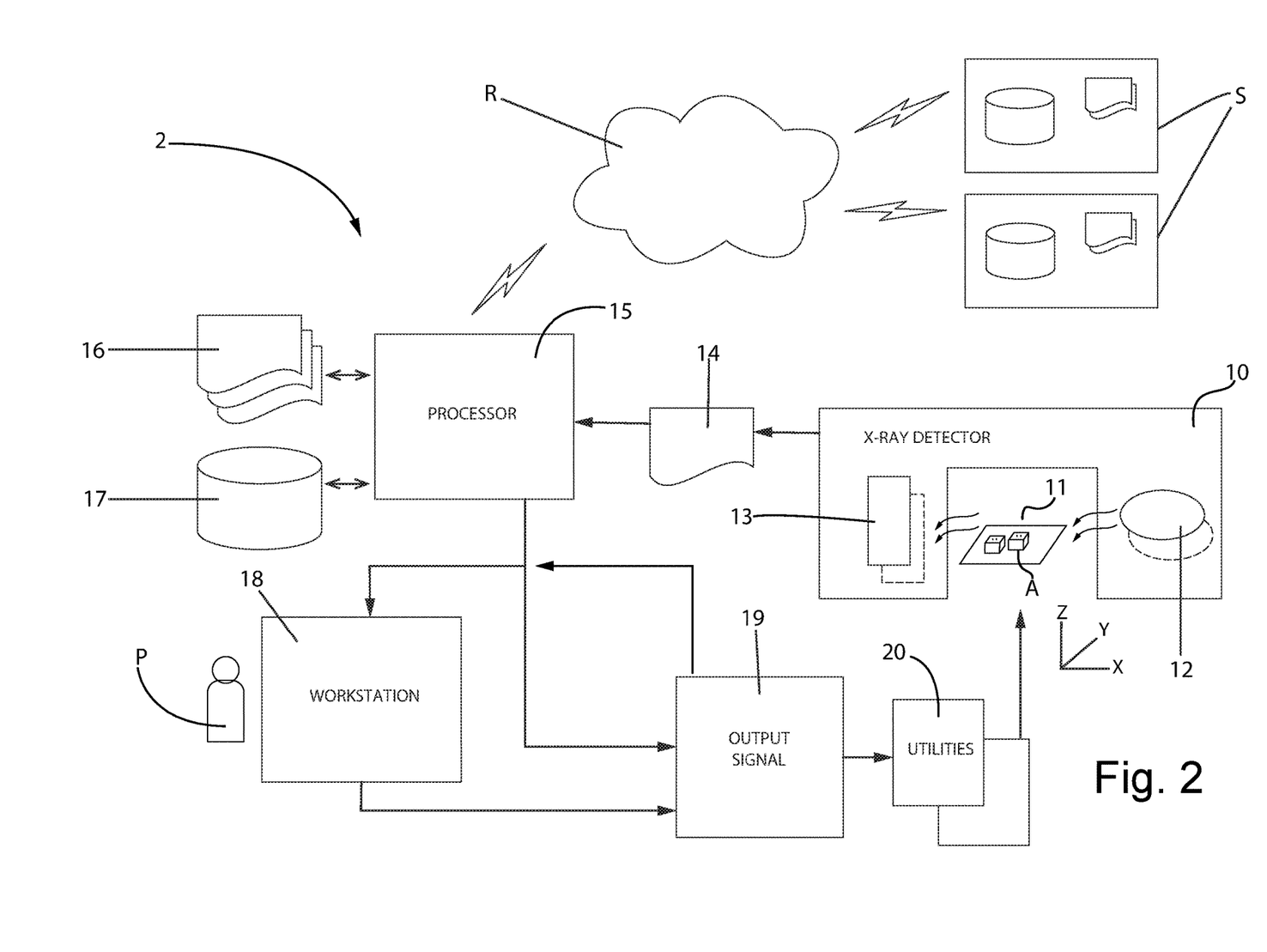
FIG. 2 is a block diagram relating to a component of the plant.

With reference to FIG. 2, sorting device 2 according to the invention comprises an X-ray detector, operating at a detection location 11 configured to temporarily contain at least a portion of at least one object A. Object A is, desirably, a lead-acid accumulator, but, undesirably, it may be another type of accumulator, device, or other object found in input material 5 originating from separate waste collection of spent and/or decommissioned accumulators.

X-ray detector 10 comprises at least one X-ray source 12 configured to emit a radiant beam, and at least one array 13 of X-ray detecting elements arranged in a predetermined position within the path of the radiant beam emitted by source 12, which path passes through the detection location 11 and therefore through the objects A contained therein at each time. For the sake of brevity, reference A is used herein both for an individual object, and for the objects as a whole.

As is well known, the absorption attenuation of the radiation emitted by the source 12 along its path inside objects A follows an exponential law; the attenuation coefficient depends, besides on the energy of the beam emitted by source 12, on the thickness of the material and above all, as far as of interest herein, on the chemical composition of object A, in particular on the atomic number (Z) of the constituent elements. The intensity of the radiation detected by each individually addressable detecting element, or pixel, of array 13 accordingly changes as a function of the magnitude of these properties.

Advantageously, the values of a grayscale or, within the bounds explained below, of a false color scale may be made to correspond to the readings of the pixels of the array—so that, possibly by combining subsequent readings over time, a two-dimensional image may be reconstructed, which gray tones (or which false colors) represent the constituent material and the related thickness in the object cross-section that is passed through, or qualitatively averaged values in the case of a non-homogeneous material, or even a three-dimensional image of the object may be reconstructed.

The radiant beam emitted by source 12 is preferably fan-shaped, having a size in a first direction X sufficient to cross the entire detection location 11, for example a size of about 70°-90°, preferably of about 80°. The size of the radiant beam in a second direction Y orthogonal to the first direction is preferably very small, for example less than 6°, preferably than about 3°, so that the radiant beam extends essentially in a plane and generates, at the array of detecting elements 13, an essentially unidimensional scan line extending generally along direction X.

The scan plane defines a section plane of objects A. A relative movement between the objects A and the X-ray detector 10 in said second direction Y provides for the radiant beam to sweep the entire detection location 11 and thus pass, section by section, through the entire object A or portion thereof contained within the detection location 11.

The reading of the detecting elements of the array 13 is periodically carried out during the relative movement between the X-ray detector 10 and the objects A, and a predetermined number N of sequential readings is suitably stored as current image 14. In the present description and attached claims, term "image" is broadly used so as to encompass a generic representation of the above-mentioned characteristic features of what is present in the detection location 11 (chemical composition of object A, in particular atomic number Z of the constituent elements, and thickness of the material), not necessarily a graphical representation.

Those skilled in the art will easily understand that the number N of sequential readings (the size of the memory containing the current image 14) defines the size, along direction Y, of the observation window of the objects—broadly speaking corresponding to the above mentioned detection location 11; and that the storing means are, at least from a logical point of view, preferably of the shift type or FIFO ("First In, First Out"). Accordingly, current image 14 changes over time as far as its information content is concerned, and each effective section across an object A (or several lined-up objects A) remains available only for a certain time in the memory containing the current image 14. According to the reading speed of array 13 and to the storing speed, the relative speed between X-ray detector 10 and objects A may be comprised, for example, between about 0.2 m/s and about 0.4 m/s.

The current image 14 is transmitted to a processor 15 which, as better detailed below, provides to compare the information contained therein with one or more threshold data 16 and/or with the contents of a database of sample images 17.

Optionally, processor 15 may also provide to a workstation 18 intended for an operator person P the current image 14 and/or said threshold data 16 and/or sample images 17 of said database, in the original form or preferably in a derived form, more immediately enjoyable by the operator person P (in particular in the form of gray tones or false color images, and respective legends of the gray tones/false colors), as well as possible results of processing made by the processor 15 based on the inputs provided to the processor 15 itself.

Processor 15 and/or operator person P through the workstation 18, if provided for, emit a sorting signal 19. In the present description and the attached claims, term "signal" should be understood in its broadest possible meaning, to indicate "any form of matter or energy capable of propagation carrying along information", wherein the information carried by the sorting signal 19 consist at least in an indication of whether in the detection location 11 there is at least one object other than a lead-acid accumulator, and that accordingly has to be deviated as reject 6 and should not reach the mill 3 of plant 1.

The sorting signal 19 may be processed by one or more utilities 20, for example intended to stop the relative movement between X-ray detector 10 and objects A, to emit a sound and/or visual alert for the operator person P or for an operator who is present in the proximity of the detection location 11 and/or to automatically eject the objects that were at the detection location 11 at the time when the current image 14 has been acquired. The automatic ejection may for example be made by a piston pusher selectively acting in a direction orthogonal to (or more in general forming a given angle with) the direction of relative motion between X-ray detector 10 and objects A, by an anthropomorphous robot, by a fall door of objects A, by a deflector that can be selectively placed in the path of objects A, and in still other manners.

To the end of increasing the reliability of sorting device 2, processor 15 may be connected with equal or compatible remote systems S, through a network R which may for example be Internet, and configured to receive additional and/or updated sample images and/or threshold data from said remote systems S, as well as possibly to transmit its own sample images and/or its own threshold data to the remote systems S.

Irrespectively of whether it is connected in network R or not, the processor 15 is preferably provided with artificial intelligence, and in particular it is capable of learning in order to improve the decisional processes, thus enhancing the reliability of the sorting device 2. Processor 15 is preferably of a neural network type.

Figure 3:
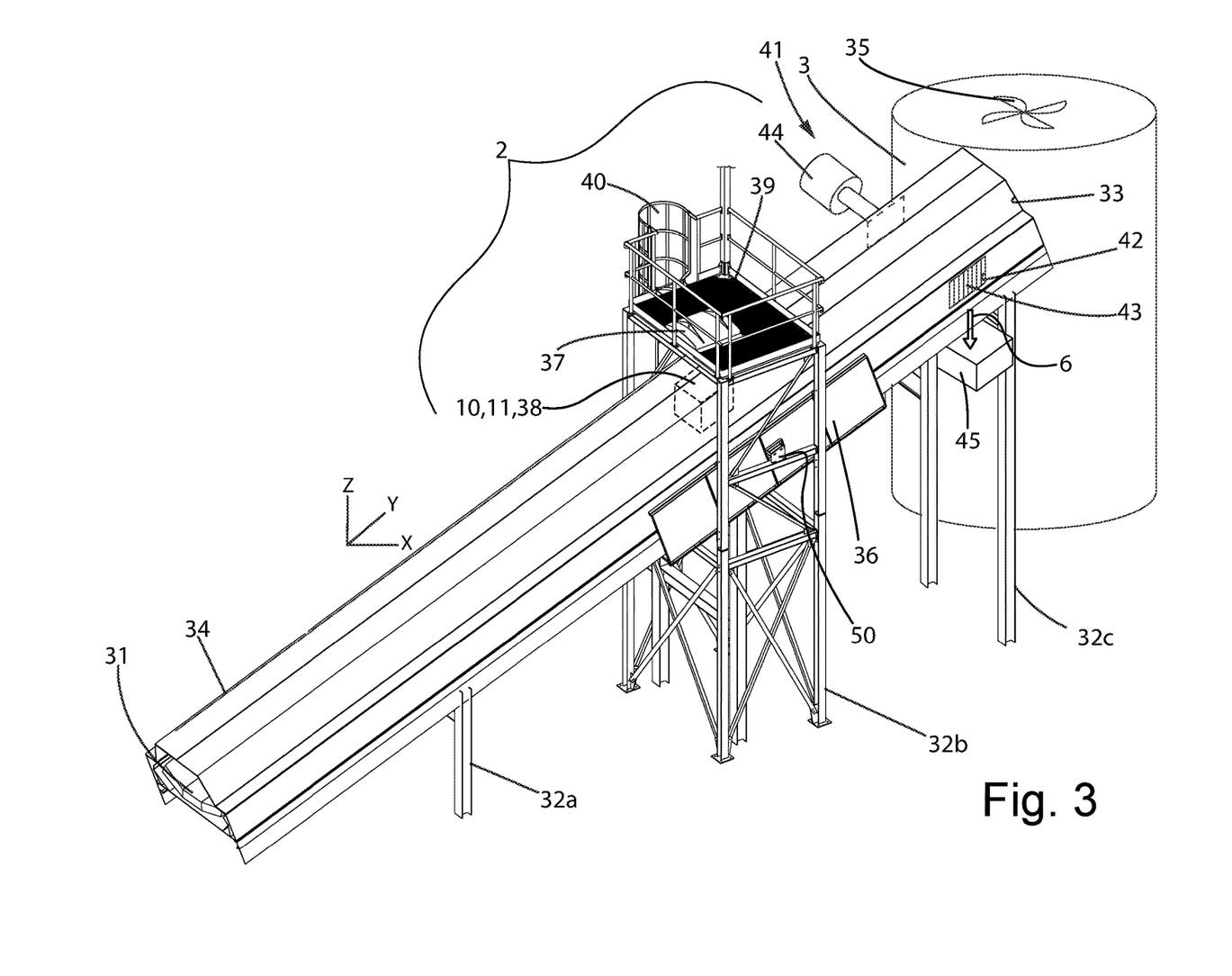
FIG. 3 is a diagrammatic view of a portion of an embodiment of the plant of FIG. 1.
Figure 4:
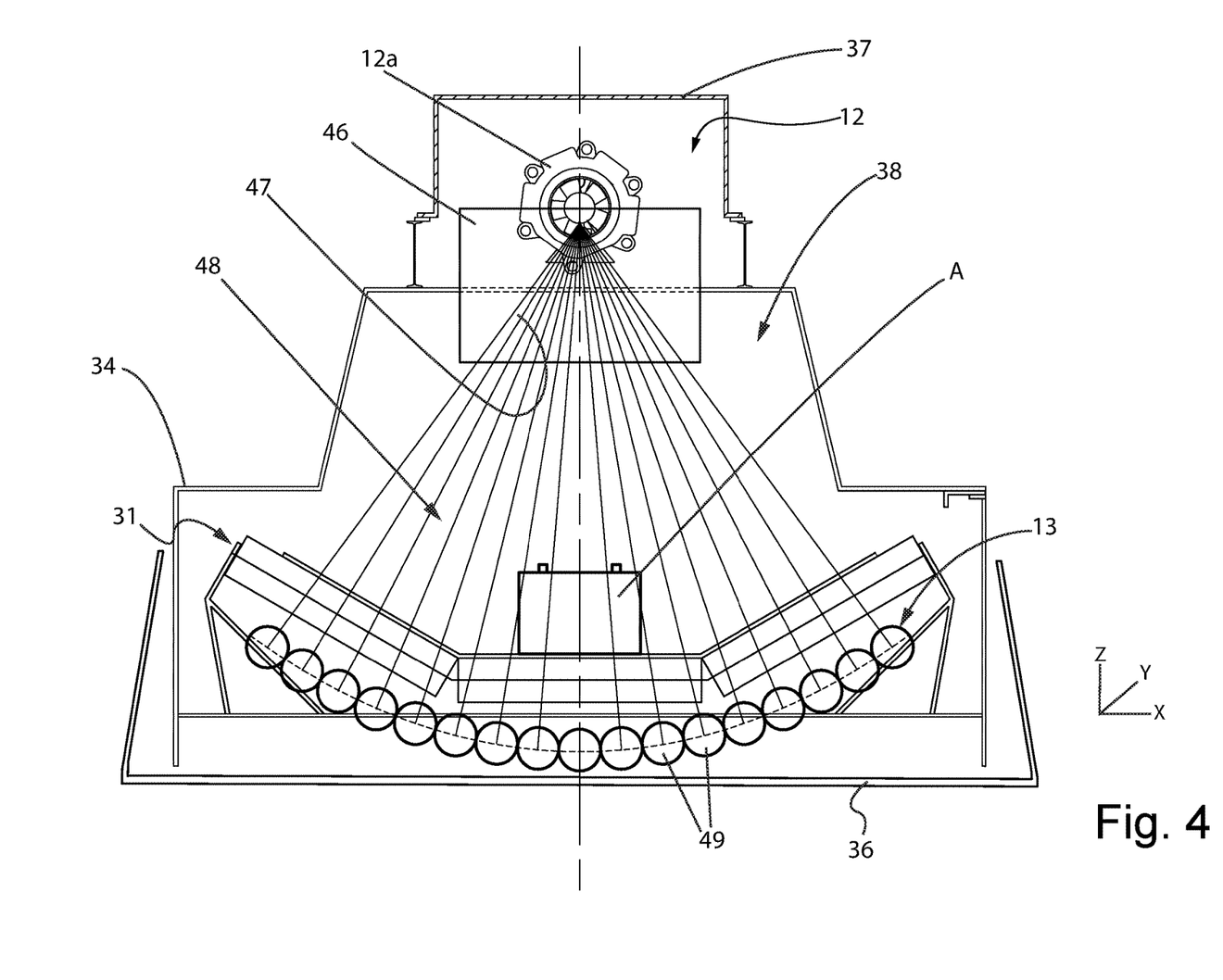
FIG. 4 is a sectional view across a detection location of the plant of FIG. 3, FIGS. 5-7 are diagrammatic representations of other embodiments of an X-ray detector of the plant according to the invention.

In FIGS. 3 and 4 an exemplary embodiment of a portion of plant 1 is shown, comprising in particular sorting device 2 and mill 3.

Sorting device 2 comprises, in this case, a conveyor 31, for example a closed loop mat conveyor belt or a or segmented one, which carries out the above-mentioned relative movement between X-ray detector 10 and objects A. The conveying direction of conveyor belt 31 is direction Y, while the direction transversal to the conveyor belt is the scan direction X of X-ray detector 10 (FIG. 4).

Conveyor 31 advantageously also acts as a feeder of mill 3, and is typically ascending, suspended on feet 32a, 32b, 32c of increasing height moving towards a mouth 33 of mill 3.

Conveyor 31 is preferably inserted in, or forms the bottom of, a metal tunnel 34, which at its downstream end (with reference to the conveying direction) connects with the mill mouth 33, perfectly tightly closing it.

A suction system, of which a suction fan 35 is diagrammatically shown, is provided in order to create an underpressure at the mill 3 and at the tunnel 34. The underpressure prevents the acid mist forming inside mill 3 from the electrolyte during the crushing of the lead-acid accumulators, highly harmful, from dispersing into the environment, so as to safeguard the health of the operators of plant 1. Fan 35 is shown at the top of mill 3, but it could be located elsewhere along conveyor 31.

X-ray detector 10 and detection location 11 are preferably embedded within tunnel 34, in a position thereof which is spaced upstream (with reference to the conveying direction) of mouth 33 of mill 3.

At detection location 11, tunnel 34 is provided with leaded shielding panels 36 and with a leaded inspecting lid 37 that closes an access opening to a detection chamber 38, which is sectionally shown in FIG. 4. In the present description and the attached claims, term "leaded" indicates a treatment allowing X-rays to be shielded. An inspection platform 39, that may be reached through a ladder 40, for example a cage ladder, may be made about the leaded inspecting lid 37.

Between detection location 11 and mouth 33, namely downstream of detection location 11, there is an ejector device 41. An ejection door 42 is formed laterally within tunnel 34. Door 42 is resealable in a sufficiently tight manner by the underpressure created by the suction fan 35, for example through an overlapping rubber strip curtain 43.

A piston pusher 44 is retractable on the side of the tunnel 34 opposed to the door 42, and is extendable in direction X along the entire width of conveyor 31. When the sorting signal 19 indicates the presence of at least one object other than a lead-acid accumulator, the pusher is selectively actuated, so as to push said object out of the door 42. Undesirably, any lead-acid accumulators particularly close to the undesired object might also be pushed, and may be recovered as mentioned above.

A reject container 45 is shown under the lateral door 42, but it could be missing or be replaced for example by a second conveyor belt. Advantageously, a second conveyor belt at a low speed could allow the objects A to be further spaced apart before they are input again onto the main conveyor 31 upstream of detection location 11, so as to increase reliability of the sorting.

A suitable X-ray source 12 comprises, for example, an X-ray tube having a nominal voltage for example of 200 kV or 150 kV, with focal spot preferably of 0.8 mm size, as measured according to the standard EN 12543. The X-ray tube preferably has a tungsten anode. The X-ray tube is preferably provided with internal power supply, safety circuit against overheating, oil and/or forced air cooling system, and/or high frequency voltage multiplier.

As better manifest from FIG. 4, X-ray tube 12a of source 12 of X-ray detector 10 is housed within a suitable seat of a support 46. Support 46 has a directional irradiation cavity 47 which on one side is open at the output window of source 12, and on the other side is open at the face of support 46 facing the conveyor 31. Directional irradiation cavity 47 is frustoconically-shaped in the sectional plane of FIG. 4 and defines the width of the fan-shaped radiant beam 48. If the support 46 is not made of lead or leaded material, directional irradiation cavity 47 is preferably provided with a leaded coating, so as to retain elusive radiation.

Array 13 of X-ray detecting elements preferably comprises a plurality of boards 49, each one comprising a linear detector device having a certain number of individually addressable detecting element, or pixels. For example, there may be seventeen boards 49, each one provided with a 64-pixel linear detector device, totaling 1088 pixels for each scan line. Array 13 of X-ray detecting elements is preferably of the CCD type. Furthermore, there may be one or more electronic components (not shown) for controlling data acquisition from the various boards 49 and for managing transmission of the acquired data to processor 15.

All the detectors of array 13, namely all boards 49, are suitably fixed to a support strip 50 (FIG. 3), which guarantees perfect mutual alignment thereof and facilitates the alignment operations with respect to the source 12 and to the output window of cavity 47 of support 46.

Support strip 50 is preferably curved, the boards 49 with the detecting elements of the array 13 being supported onto its concave surface. This arrangement is advantageous, on one hand because the distance of the various detecting elements from the source 12 is less variable than if the array were flat; on the other hand, this arrangement better fits to the top, conveying surface of conveyor 31, which is also generally concave in order to better laterally retain objects A.

In any case, processor 15 may be configured to properly take said distance of each pixel from source 12, and/or the mutual slant between the propagation directions of the X-rays detected by each pixel of array 13, into account during the formation of the current image 14.

It should be understood that, with the above-mentioned positioning of the array 13 of detecting elements below the conveyor 31, the latter has to have suitable features of transparency to, or low absorption of, X-rays. Suitable materials for conveyor 31 include layers of rubber of different compounds glued together, with interposed meshes of plastic material to improve the mechanical resistance in the longitudinal direction.

X-ray detector 10 may be more complex than that shown in FIG. 4, so as to provide a more accurate information in the current image 14. A second source of X-rays, or even more than one, may be provided for, associated with the same array of detecting elements or with a respective array of detecting elements, and/or arrays of dual sensitivity detecting elements, and/or dual emission sources may be provided for, as better disclosed hereinbelow.

Figures 5, 6, 7:
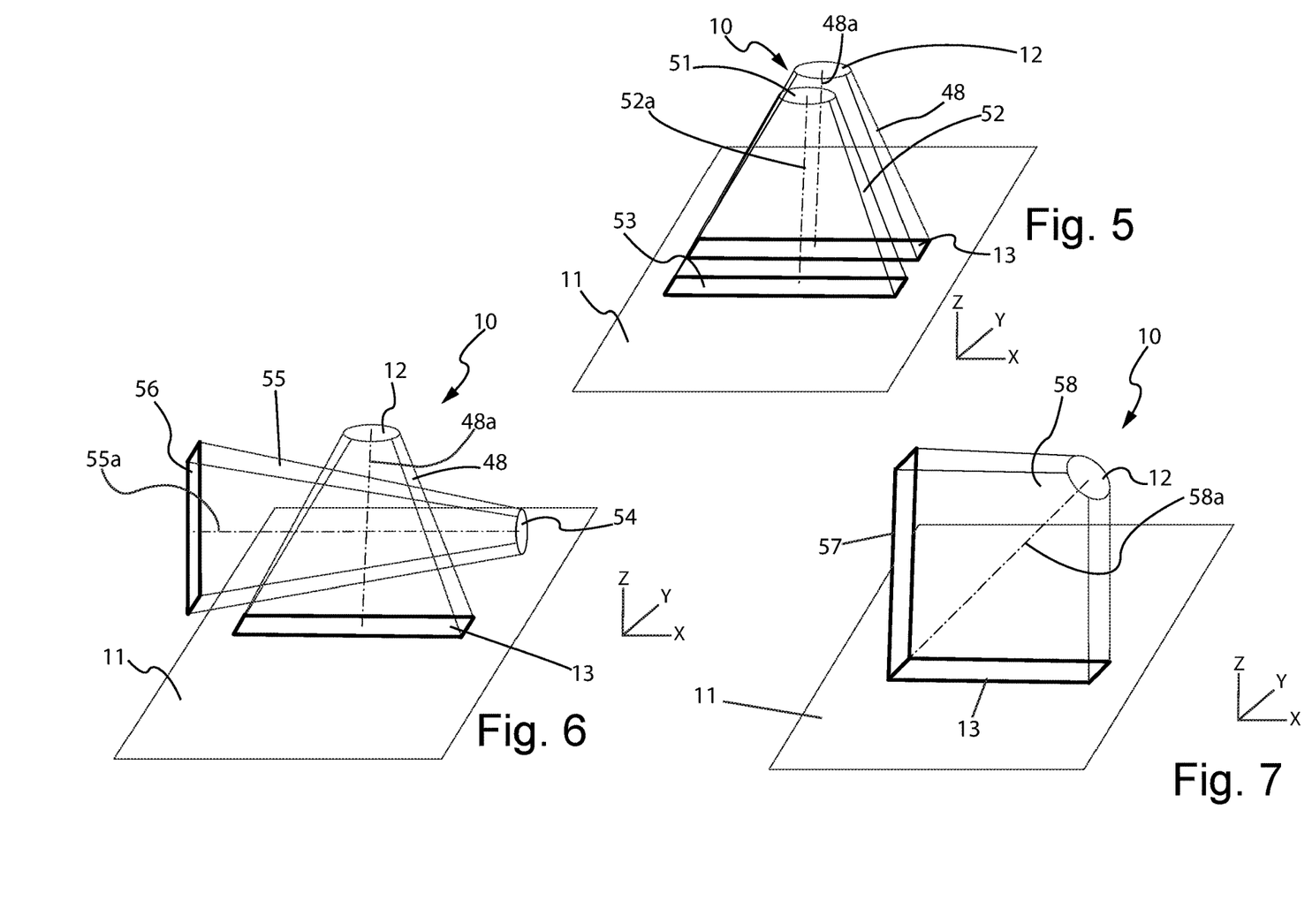

Some configurations are shown, merely by way of a not limiting example, in FIGS. 5-7. In those figures, the arrays of detecting elements are represented as rectangles for the sake of simplicity, buy it should be understood that they may extend along a curve as described above. The direction of the major dimension of the array is referred to as scan direction.

In a configuration, diagrammatically shown in FIG. 5, there are a second source 51 and an associated second array 53 of detecting elements; the two sources 12, 51 and the two arrays 13, 53, respectively, are side by side in the direction Y of the relative movement between objects A and X-ray detector. The X-rays emitted by the second source 51 form a radiant beam 52 having a mean propagation direction 52a essentially parallel to mean propagation direction 48a of the radiant beam 48 emitted by source 12, both mean propagation directions 48a, 52a extending along direction Z, but they have a different energy than the X-rays emitted by source 12. Because for each material there is a different attenuation of the two beams having different energies, by combining the information of the second array of detecting elements 53 with that of the array of detecting elements 13 it is possible to obtain a more detailed information about the material composition in the section of objects A scanned at each time, and therefore a better discrimination of materials is possible, and therefore a more accurate sorting signal 19 may be emitted. In particular, in this case it is possible to also obtain a false color current image 14, more directly enjoyable by the operator person P.

In an alternative configuration, not shown, the two sources 12, 51 emitting X-rays at different energy could be configured to emit beams 48 and 52 which are not parallel, rather converging onto a single array of detecting elements 13 capable of detecting the dual exposure. In a still further configuration, not shown, a single dual exposure ("dual energy") source could be used, associated with a single array of dual exposure detecting elements 13.

In a configuration, diagrammatically shown in FIG. 6, the X-rays emitted by the second source 54 form, instead, a radiant beam 55 having a mean propagation direction 55a (extending along direction X) essentially orthogonal to the mean propagation direction 48a of the radiant beam 48 emitted by source 12, possibly having the same energy as the X-rays emitted by source 12; second source 54 is associated with a second array 56 of detecting elements, having a scan direction along direction Z, which is the vertical direction extending height-wise above conveyor 31 and therefore is the direction of the thickness of the scan section. This configuration allows undesired objects to be individuated, which are totally hidden to the view of the main pair of source 12 and array 13 by lead-acid accumulators of greater size and overlapping along direction Z.

In another configuration there may be, besides source 12, an additional source arranged as the source 51 of FIG. 5, and an additional source arranged as the source 54 of FIG. 6, with the respective arrays of detecting elements 53, 56, or with the single additional array 56 when array 13 is associated with both sources 12 and 51.

In an analogous manner to what has been described above with reference to FIG. 5, also for the scan along direction Z a more accurate information may be obtained by using radiations with a different energy, by providing for the source 54 to have a dual exposure and the sensor 56 to have a dual sensitivity, or by providing for an additional source (not shown) which emits a beam converging with beam 55 onto the same sensor 56, having a different energy with respect to that of source 54, or by providing for a further additional source (not shown), with a respective array of detecting elements (not shown), forming a radiant beam having a mean propagation direction essentially parallel to the mean propagation direction 55a of the radiant beam 55 emitted by source 54, with a different energy with respect to that of source 54. When there are additional sources for both the scan directions X and Z, preferably they have the same energy.

The various configurations mentioned above may be combined according to the needs, merely by way of an example, another configuration of X-ray detector 10 might provide for just the single exposure source 12 for scanning along direction X and, conversely, a dual exposure source or two sources for scanning along direction Z.

In a configuration, diagrammatically shown in FIG. 7, the X-rays emitted by source 12 form a radiant beam 58 still emitted in plane XZ, but having an oblique mean propagation direction 58a, and preferably at 45° with respect to the thickness direction Z of objects A; source 12 is associated not only with the array of detecting elements 13, rather also to a second array of detecting elements 57 having scan direction Z. It is understood that the two arrays of detecting elements 13, 57 may also be combined into a single folded or curved array of detecting elements. Also in the case of this configuration, that allows undesired objects to be individuated, which overlap along direction Z with lead-acid accumulators of greater size, the above-mentioned variants—using a dual emission possibly with a dual exposure array, or using a second source—may be applied in order to obtain greater information.

In a further configuration of X-ray detector 10, not shown, source 12 and any second source and additional sources may be arranged in a lower position, possibly below conveyor 31, the array 13 of detecting elements being arranged in an upper position, above the height of objects A.

It is understood that in the various embodiments described above, processor 15 may suitably combine the information read by the various arrays of detecting elements. Those skilled in the art shall understand that it is possible to further provide for one or more additional source-array of detecting elements pairs (even with shared array of detecting elements), having a still different energy and/or acting onto section planes forming different angles with the plane of the main pair formed of source 12 and array 13 of detecting elements.

Figure 8:
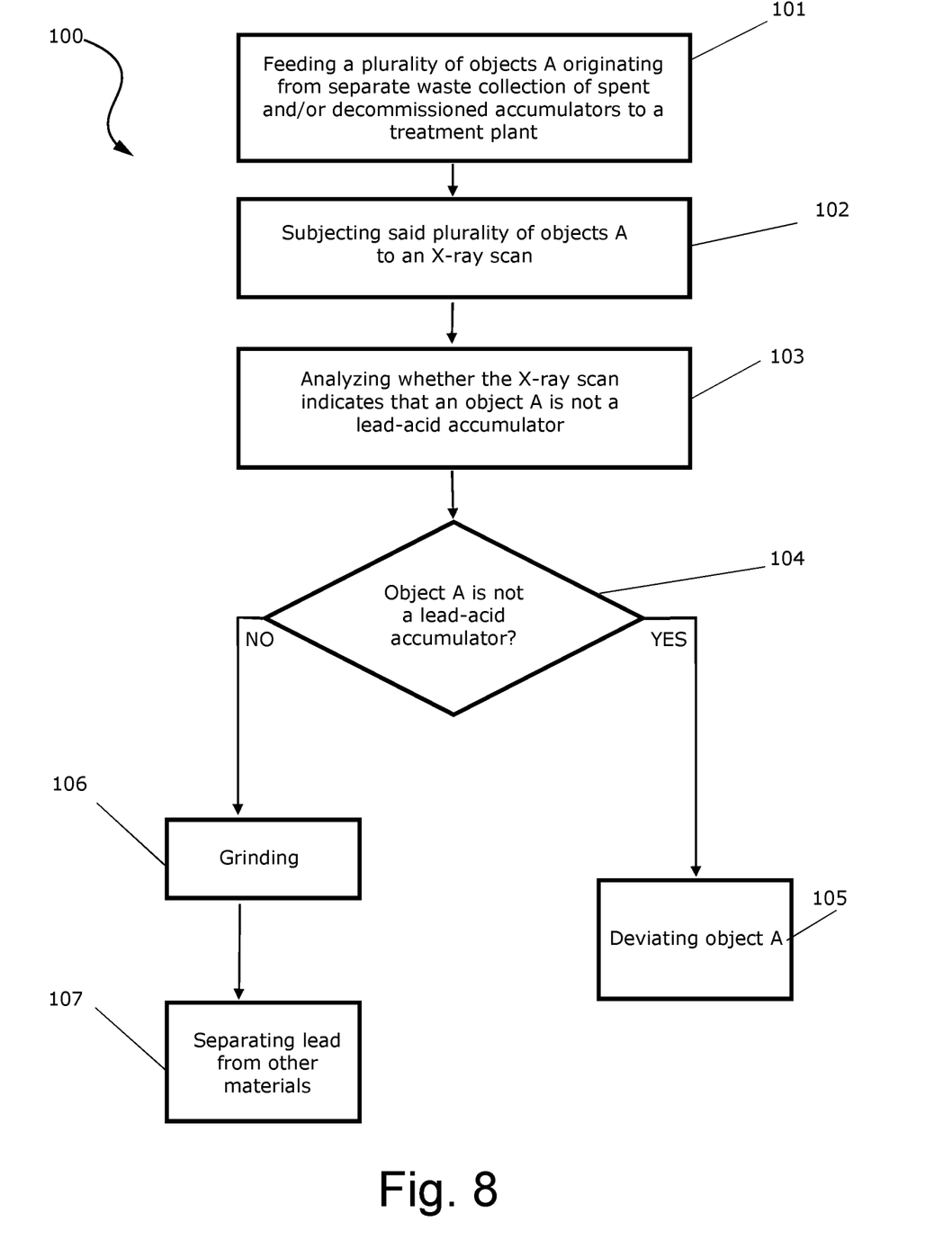
FIG. 8 is a flowchart of a process for treating spent and/or decommissioned accumulators according to the invention.

With reference to FIG. 8, a process 100 for treating spent and/or decommissioned accumulators according to the invention comprises the following steps. The process disclosed hereinbelow is also illustrative of the operation of the above disclosed plant 1.

In a step 101, a plurality of objects A originating from separate waste collection of spent and/or decommissioned accumulators is fed to a treatment plant, such as the above described plant 1; said objects A nominally comprise lead-acid accumulators, but also accumulators and objects of a different type.

In a step 102, said plurality of objects A is subject to an X-ray scan.

In a step 103 it is analyzed whether the X-ray scan indicates that an object A is not a lead-acid accumulator.

As indicated by a decisional block 104, in case the outcome of the analysis of step 103 indicates that an object A is not a lead-acid accumulator (positive outcome of the check of block 104), step 105 is carried out, of deviating said object A out of the treatment operating sequence, for example inputting it into the reject flow 6 of plant 1.

If conversely the outcome of the analysis of step 103 indicates that object A is a lead-acid accumulator (negative outcome of the check of block 104), the latter remains in the treatment operating sequence and is forwarded to the subsequent treatment steps, that typically comprise a step 106 wherein the objects A not deviated in step 105 are ground, and a subsequent step 107 wherein lead is separated from other materials.

For the sake of simplicity, in the flow chart there is shown a single occurrence of step 103 and subsequent steps, but it should be understood that the check is carried out for each object A visible in the X-ray scan.

Process 100 is preferably carried out in continuous in a plant which, as the above described plant 1, is provided with a conveyor 31.

Irrespectively of the fact that it is carried out in continuous or not, the analysis step 103 and the decisional process of block 104 may take place in an automatic manner, in a manual manner (namely controlled by an operator person) or in a semiautomatic manner. The process may be advantageously carried out in a manual or semi-automatic manner in a preliminary step of calibration and/or learning, preferably based on sample accumulators of various known types, and subsequently in an automatic manner.

Figure 9:
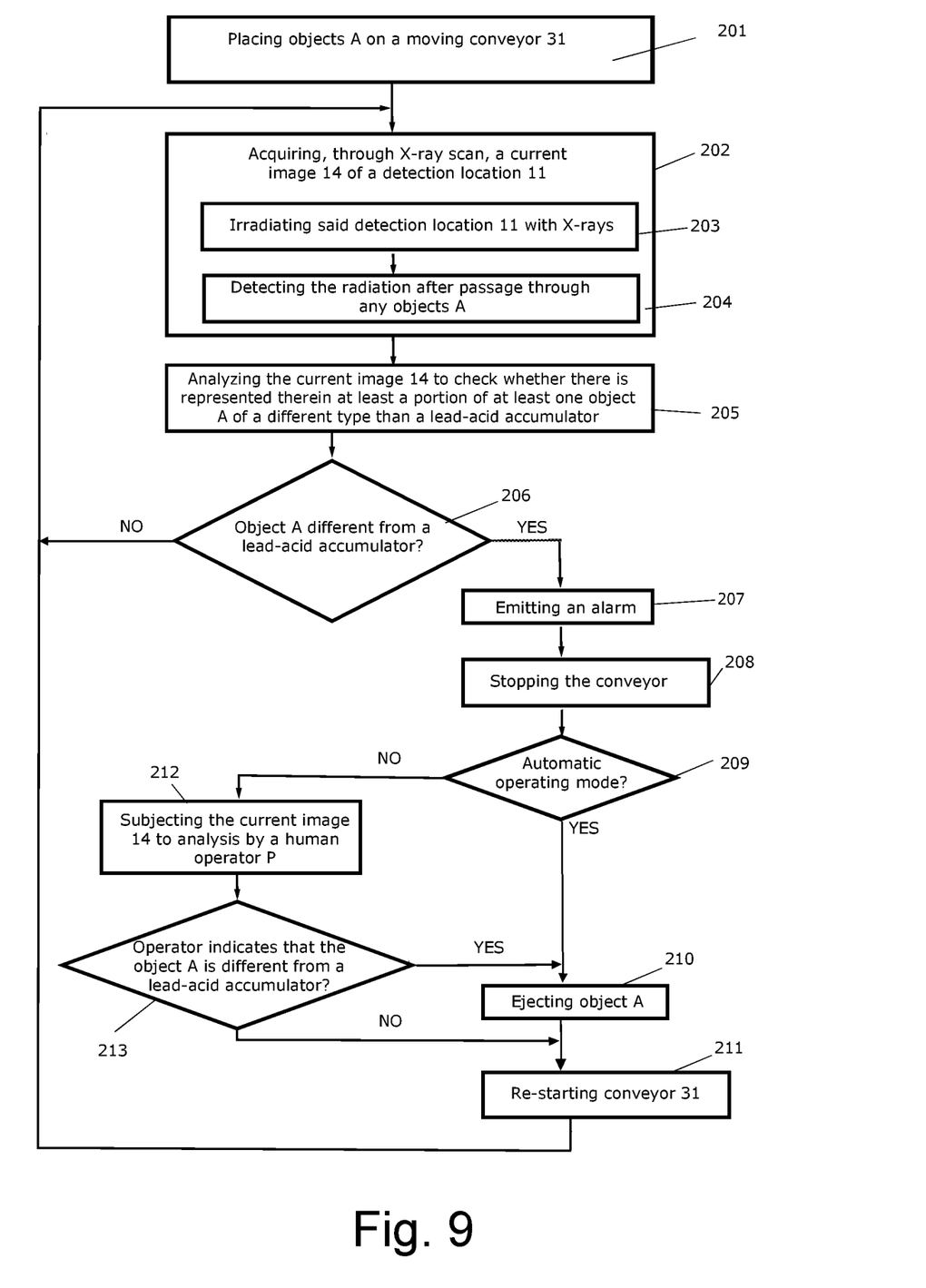
FIG. 9 is a flowchart of a portion of an embodiment of the process of FIG. 8.

The above-mentioned various options and possibilities are made clearer with reference to FIG. 9, which is a flowchart of an exemplary embodiment of steps 101-105 of the process, and which is described, merely by way of an example, with reference to the specific plant 1 described above.

In a step 201, objects A are placed on a moving conveyor 31, upstream of a detection location 11 passed through by the path of conveyor 31.

In a step 202, a current image 14 of detection location 11 in a time interval is acquired, through X-ray scan, representative of one or more objects A or portions thereof.

Specifically, the acquisition step 202 is preferably carried out through subsequent linear scans, as diagrammatically shown, and comprises irradiating 203 said detection location 11 with X-rays and detecting 204 the radiation after passage through any objects A present in the detection location 11 during the time interval.

In a step 205, the current image 14 is analyzed, as better discussed hereinbelow, to check whether there is represented therein at least a portion of at least one object A of a different type than a lead-acid accumulator present in the detection location 11 during the time interval.

As indicated by a decisional block 206, in the negative case no action is taken.

In the affirmative case, optionally an alarm is emitted in a step 207; refer in this respect to the previous discussion of the sorting signal 19 emitted by plant 1. In a step 208, conveyor 31 is stopped. In the case of an automatic operating mode, as checked in a block 209, the object is ejected in a step 210, and conveyor 31 is re-started in a step 211.

In the case of non-automatic operating mode, exit NO from block 209, the current image 14 is subject, in a step 212, to analysis by an operator person P, for example by displaying it on a display of workstation 18. The current image 14 may be previously subject to processing in order to enhance its information carrying capability, for example by applying an unsharping masking, tools for magnification, rotation, energy stripping (displaying a single family of elements or a combination of families of elements) etc.

Then, an input by the operator person P is received and evaluated in a step 213. If the operator person P has indicated that, in his/her opinion, in the current image 14 there is represented at least one portion of at least one object A of a different type than a lead-acid accumulator, then one proceeds with carrying out said step 210 and subsequently said step 211; otherwise one directly proceeds with carrying out said step 211.

In both cases, after execution of step 211, or when the check of block 206 was negative, execution of step 202 of acquisition of a new current image 14 is returned to.

It shall be understood that in actual use, succeeding current images 14 may overlap in part in respect of information contents, namely a same scan line (thus a section across a same object) may be contained within a plurality of succeeding current images 14; vice versa if the succeeding current images 14 analyzed in step 205 are formed of all different scan lines, then two (or more) different portions of a same object A may be present in two (or more) succeeding current images 14. The process, and in particular the processor 15 by which it is implemented, will properly take such situations into account, by providing, if necessary, for a buffer memory for plural succeeding current images 14 and/or for the possibility of conveying the objects A rearwards, by reversing the movement direction of conveyor 31 after execution of steps 208, 211 of stopping and restarting thereof. For the sake of simplicity, the buffer memory is not shown in the block diagram of FIG. 2.

Furthermore, it may happen that in step 210, besides object A also other objects are ejected, which were in the detection location 11 during the time interval (and which meanwhile have moved forward by a length, up to the ejector device 41); then, as discussed above, there may advantageously be a second step (not shown) of sorting the reject flow 6 and/or of re-inputting the objects onto conveyor 31.

As far as the current image 14 is concerned, its processing by processor 15 in steps 103, 104, 205, 206, and any interpretation by the operator person P of the same current image 14 or of a derived representation thereof (cf. steps 212, 213), the following is noted, the implementing details being within the skills of those skilled in the art. As mentioned, the current image 14 is a representation, in any suitable format, and preferably in gray tones or in false colors, of the constituent material and of the relative thickness at the various points of each object section passed through, or qualitatively averaged values in the case of a non-homogeneous material. In greater detail, if every detected object were a homogeneous slab of a pure chemical element, then, the thickness of the various slabs being equal, it would be possible to distinguish with certainty the different chemical elements, for example from the gray tone or from the color of the respective image. In the case of interest herein, lead-acid accumulators, as well as lithium-ion accumulators, other accumulators, various devices and objects present in the material originating from separate waste collection of spent and/or decommissioned accumulators are, obviously, objects of varying size and of heterogeneous materials.

The Applicant has however recognized that the image of lead-acid accumulators, that it is desired to forward to the mill 3, is markedly different, in particular markedly darker if represented in gray tones, with respect to the image of lithium-ion accumulators, that it is desired to reject into the reject flow 6 because of the risk of explosion inside the mill 3, highlighted above, and also with respect to the image of most other undesired components often found in the material originating from separate waste collection of spent and/or decommissioned accumulators.

Based on this consideration, first it is possible to set one or more threshold data 16 of the values with which the various points of the image are represented, for example a threshold of values of gray tones, with which threshold(s) the values of each point or pixel of current image 14 are to be compared, in the analysis step, in order to evaluate whether there is lithium—or other elements that are desired to be rejected—among the objects A in detection location 11 at the time of acquiring the current image 14. The pointwise evaluation, pixel by pixel, however entails a high rate of false positives.

In order to obviate thereto, the processor 15 advantageously implements, alternatively or additionally thereto, an image-wide or image-region-wide analysis, so as to identify a non-negligible number of pixels, and preferably contiguous pixels in a region of not negligible size, having a value representative of lithium—or of other elements that are desired to be rejected. In such a manner, only objects comprising lithium or other material in a non-neglectable amount, respectively pieces of lithium or other undesired material of a non-neglectable size, are rejected.

As a further possibility, to be taken into consideration alternatively or additionally to one or more of the preceding ones, the processor 15 implements an analysis of comparison between the current image 14, or regions thereof, and sample images 17. The sample images 17 comprise images of lead-acid accumulators, of lithium-ion accumulators, of other types of accumulators and batteries, and/or of other objects not infrequently found in the material originating from separate waste collection of spent and/or decommissioned accumulators, in the respective various geometric shapes and standard, or in any case common, size. The specific geometry of lead-acid accumulators and of other accumulators and objects, as well as the geometry of internal components thereof, and their mutual relationship, may thus be advantageously used as the only criterium or as further criterium during the analysis of the current image 14.

The sample images 17 may, alternatively and/or additionally, represent one and a same type of object (or objects according to minor variants) in the various orientations and/or in the various positions within the detection location 11, so that it is not necessary to apply any roto-translation and/or sliding window algorithms in the comparison between images.

Alternatively or additionally, a processing may be carried out, which provides for searching for a region of the current image 14 which corresponds to a single object A or to a portion thereof, and cancelling the information contents of the remaining part of the current image 14, or extracting a secondary image, the steps of comparing with threshold data 16 and/or sample images 17 being then carried out onto the cleaned up image or onto the secondary image.

A further problem concerns, as mentioned, the fact that within the detection location 11 there may simultaneously be two or more different objects, possibly overlapping, in part or completely, along said direction Z. Experimental tests have proven that even a small non-overlap region between a lead-acid accumulator and a lithium-ion accumulator allows the latter to be detected. If the overlap between a larger lead-acid accumulator and another smaller object is complete (irrespectively of which one is the uppermost and which one is the lowermost), it may however turn out to be difficult to detect the smaller object, if not indeed impossible at least for the operator person P, especially when the representation is in gray tones. The above disclosed embodiments with dual exposure sources and/or with plural X-ray sources, besides being advantageously capable of being represented with false color images more enjoyable for the operator person, allow such a drawback to be overcome, by reducing down to a minimum the false actuations and, even more important, by reducing the number of cases wherein lithium-ion accumulators reach the mill 3 or the grinding step 106, and by restraining them to lithium-ion accumulators of small size which, as a consequence, would cause small explosions inside the mill 3.

As mentioned, processor 15 is preferably of a neural network type, with self-learning capabilities, and advantageously implements a classifier. The sample images 17 are preferably grouped into classes according to desired affinity criteria. Learning by processor 15 may be supervised by operator person P, for example by having the processor 15, in a manner analogous to what has been described above, present to the workstation 18 the current image 14, any sample image 17, and a proposal of automatic decision, and await the decision taken by the operator person P, from which to learn and refine its decision criteria.

In case the ejector device 41 is an anthropomorphous arm robot, the processor 15 may also individuate, and send to the robot, the position of the object to be rejected within the detection location 11, so as to facilitate its grip.

In the above discussed embodiment, the relative movement between objects A and X-ray detector 10 is given by the fact that the objects A are conveyed on a conveyor belt, while the source 12 and the array 13 of detecting elements (and the other possible components of X-ray detector 10) are advantageously stationary. Alternatively, one or more slides for moving the source 12 and the array 13 (and the other possible components of X-ray detector 10) through the detection location 11 may be provided for, a certain number of objects A being then advantageously inserted in the detection location 11, kept there stationary for a sufficient time for scanning the entire detection location 11, and subsequently replaced by other objects A. Besides loading and unloading manually or through a robot arm, this may take place for example through a "carrousel" feeder, comprising a disc plane divided into several slice-shaped compartments, and rotating in such a manner as to present one compartment at each time in the detection location 11.

According to another alternative, the detecting elements may be arranged in a two-dimensional array, a single slide for moving the X-ray source(s) being provided for, or, according to still another alternative, plural X-ray source(s) or means for widening the X-rays beam being provided for, so that no relative movement between the X-ray detector 10 and the objects A is necessary in order to take a two-dimensional image of the detection location 11.

According to a further alternative, the above described detection and analysis operations may be carried out onto the unidimensional image corresponding to a single scan line, however such an analysis turns out to be more subject to errors in that it may only be based on the recognition of the constituent elements, and may not be based on the comparison with sample images 17.

A presence and/or height detector of objects A may advantageously be provided for upstream of the detection location 11 in order to improve the information contents of the image, for example by changing the intensity of the emitted radiation and/or by normalizing the values detected along the scan with respect to the maximum height within the scan.

In order to reduce the problem of object overlap, there may be, upstream of the sorting, a mechanical system that makes the overlying objects fall, such as for example a bar suspended at a given height above conveyor belt 31.

In the above it is considered that the value of each pixel represents an index directly correlated with radiation attenuation at the corresponding detecting element. The step of analysis of the process may however be carried out onto other indexes correlated with radiation attenuation, for example onto a color associated with the value of each pixel, onto average values, onto minimum values, onto maximum values, onto values computed through a statistic or mathematical analysis of the values of the various pixels etc. The various implementation possibilities are within the skills of one skilled in the art, in the light of the present description.

In general, it is possible to use any index correlated with the modification of X-rays by the objects A.

It is worthwhile emphasizing that in the prior art plants for treating spent and/or decommissioned lead-acid accumulators, a sort of sorting device is made by the fact that, along a conveyor belt feeding the mill, there are one or more magnets, e.g. electromagnets, which catch small metal and in particular ferrous pieces, such as screws, nuts, etc. It is noted that in the plant 1 according to the invention, advantageously, such magnets may be avoided. The plurality of objects A subject to the described process may thus, advantageously, comprise a non-sorted fraction of the separate waste collection of spent and/or decommissioned accumulators.

It will be understood that the material to be ground 7 may be temporarily stocked, downstream of the sorting, in any apparatus and/or container before being input to the mill 3.

It is understood that the means for storing the current image 14, as well as the means for storing the sample images 17, may be implemented in any manner and in any kind of physical or virtual support, locally and/or remotely. Likewise, the processor 15 may be hardware, firmware and/or software implemented in various manners, locally and/or remotely, not necessarily by a single processor device. The various data and control signals may be exchanged, directly or even indirectly, among the various components of the plant through any wired or wireless connection, and through any suitable communication protocol or combination of different protocols.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespectively of what is explicitly described as innovative.

Barzanò & Zanardo Milano S.p.A.

The invention claimed is:

1. A spent and/or decommissioned accumulator treatment plant, comprising:
   a grinding mill;
   at least one separator stage of lead from other materials downstream of the mill; and
   a sorting device upstream of the mill,
   wherein the sorting device is configured to receive a plurality of objects originating from a separate waste collection of spent and/or decommissioned accumulators and configured to deviate, from a treatment workflow, objects other than lead-acid accumulators so that the objects other than lead-acid accumulators do not enter the mill,
   wherein the sorting device comprises an X-ray detector configured to perform an X-ray scan of the plurality of objects and a processor configured to analyze, for each object, whether the X-ray scan indicates that it is not a lead-acid accumulator,
   wherein the X-ray detector comprises an X-ray source configured to emit a radiant beam, and at least one array of X-ray detecting elements arranged in a predetermined position within a path of the radiant beam emitted by the X-ray source,
   wherein the X-ray source is a dual emission X-ray source, capable of also emitting a second radiant beam at different energy with respect to the radiant beam, or the X-ray detector comprises at least one second X-ray source configured to emit a second radiant beam at different energy with respect to the radiant beam, and
   wherein the at least one array of detecting elements is a dual exposure detector, or the X-ray detector comprises at least one second array of X-ray detecting elements, the dual exposure detector or the at least one second array of X-ray detecting elements being arranged in a predetermined position within a path of the second radiant beam, and wherein a current image representative of the X-ray scan of at least one portion of object is a false color image.

2. The plant of claim 1, wherein the processor carries out the analysis based on comparisons between the current image representative of the X-ray scan of at least one portion of object and threshold data and/or sample images.

3. The plant of claim 1, wherein the X-ray detecting elements of each of the at least one array of X-ray detecting elements are arranged on a curved surface essentially at a same distance from the X-ray source.

4. The plant of claim 1, wherein the X-ray detector performs the X-ray scan of the plurality of objects along two mutually orthogonal directions.

5. The plant of claim 1, wherein the sorting device further comprises a conveyor for conveying the plurality of objects at the X-ray detector and an ejector device, the ejector device being arranged along the conveyor downstream of X-ray detector.

6. The plant of claim 5, wherein the conveyor and the X-ray detector are arranged inside a tunnel jointed with a mouth of the mill.

7. The plant of claim 6, wherein the tunnel is provided with a suction system and/or is free of magnets.

8. The plant of claim 1, wherein the processor is provided with artificial intelligence.

9. The plant of claim 8, wherein the processor is capable of learning and/or is of a neural network type.

10. The method of claim 8, wherein the processor is connected in a network with remote systems, and is configured to receive additional and/or updated sample images and/or threshold data from the remote systems.

11. The plant of claim 10, wherein the processor is further configured to transmit its own sample images and/or its own threshold data to the remote systems.

12. A method for treating spent and/or decommissioned accumulators, the method comprising:
a) feeding a plurality of objects originating from separate waste collection of spent and/or decommissioned accumulators to a treatment plant, the objects nominally comprising lead-acid accumulators and accumulators and objects of a different type,
b) grinding objects of the plurality of objects,
c) separating lead from other materials subsequently to step b),
wherein, previous to step b):
i) subjecting the plurality of objects to an X-ray scan, and
ii) analyzing, for each object, whether the X-ray scan indicates that the object is not a lead-acid accumulator and, in an affirmative case, deviating the object out of the treatment operating sequence; and, in a negative case, forwarding the object to step b),
wherein the analyzing of step ii) comprises analyzing a false color current image representative of the X-ray scan of at least one portion of object.

13. The method of claim 12, wherein step ii) comprises checking whether object contains at least one element selected from the group consisting of lithium, nickel, and cadmium, and
wherein the checking comprises comparing at least one index correlated with an alteration of X-rays by the object with at least one respective threshold value.

14. The method of claim 13, wherein the step ii) comprises checking whether object contains lithium.

15. The method of claim 13, wherein the at least one index is X-ray attenuation or is correlated with X-ray attenuation.

16. The method of claim 12, wherein in step ii) the false color current image representative of the X-ray scan of at least one portion of object is compared with sample images of lead-acid accumulators and/or of objects other than lead-acid accumulators.

17. The method of claim 12, wherein the analyzing of step ii) comprises an automatic analysis and/or an analysis by an operator person.

18. The method of claim 12, wherein the plurality of objects fed in step a) is an unsorted fraction of separate waste collection of spent and/or decommissioned accumulators.

* * * * *